Nov. 2, 1926.  
E. R. HEWITT  
1,605,404  
BRAKE TORQUE EQUALIZING DEVICE  
Filed Dec. 27, 1924  
2 Sheets-Sheet 1
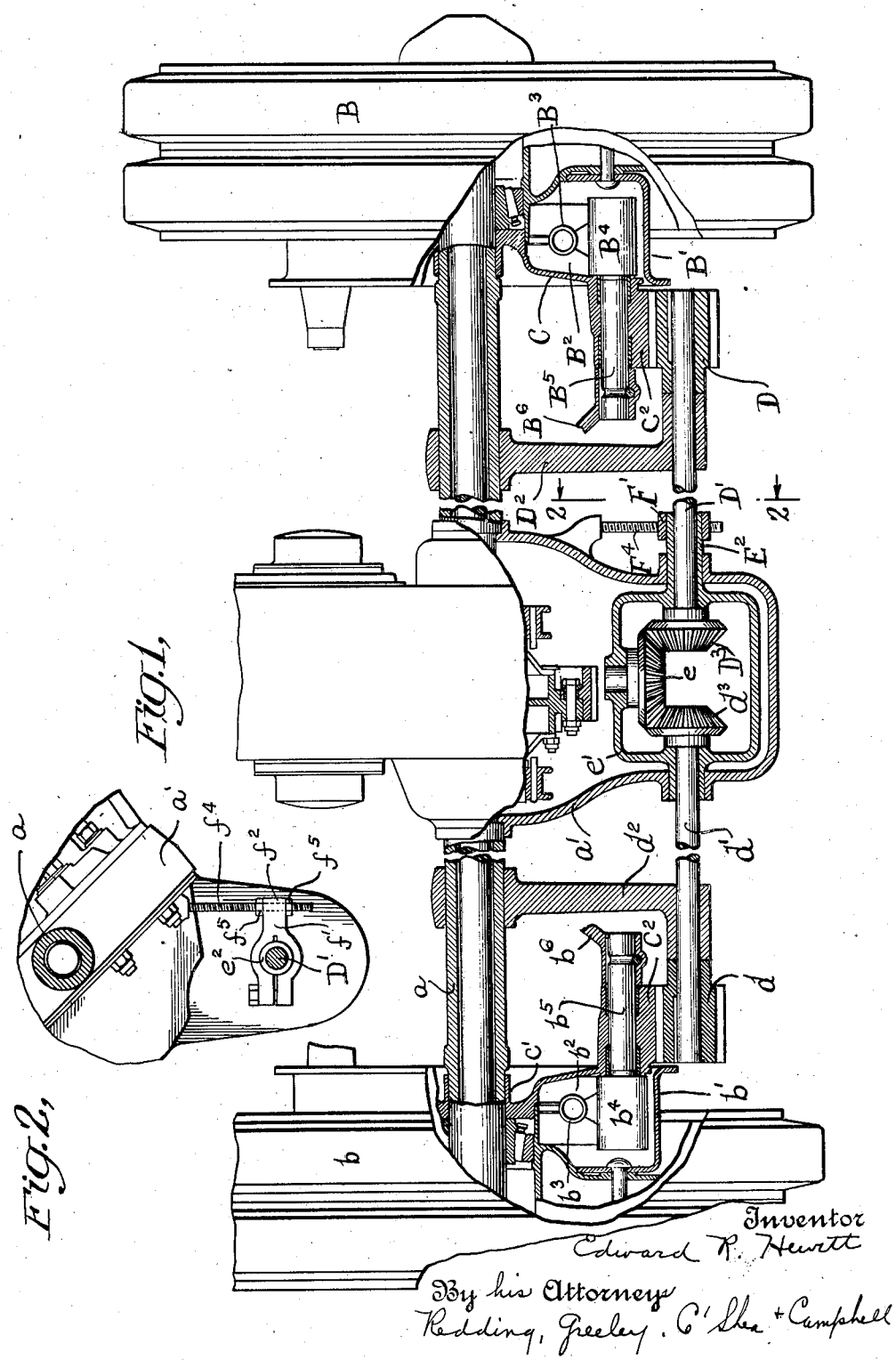
Inventor  
Edward R. Hewitt  
By his Attorneys  
Redding, Greeley, O'Shea + Campbell Nov. 2, 1926.

E. R. HEWITT 1,605,404

BRAKE TORQUE EQUALIZING DEVICE

Filed Dec. 27, 1924    2 Sheets-Sheet 2

Inventor
Edward R. Hewitt
By his Attorneys
Redding, Greeley, O'Shea & Campbell

Patented Nov. 2, 1926.

1,605,404

UNITED STATES PATENT OFFICE.

EDWARD R. HEWITT, OF MIDVALE, NEW JERSEY, ASSIGNOR TO INTERNATIONAL MOTOR COMPANY, OF NEW YORK, N. Y., A CORPORATION OF DELAWARE.

BRAKE TORQUE EQUALIZING DEVICE.

Application filed December 27, 1924. Serial No. 758,347.

This invention relates to brakes and more particularly to brakes for the wheels of motor vehicles wherein the braking effect upon the wheel at one side of the vehicle is caused to be equalized with respect to the braking effect upon the wheel at the opposite side of the vehicle. In the operation of motor vehicles it is frequently found that the brake torque at one wheel differs from the brake torque on the wheel at the opposite side of the vehicle due to various causes such as a difference in the adjustment of the brakes or a greater degree of moisture in one brake band affecting the binding action thereof or the like. It is an object of the present invention to provide brake torque equalizing devices between the brake mechanism at the wheels on the respective sides of the vehicle whereby the braking effect upon one wheel will be commensurate with the braking effect upon the wheel at the opposite side of the vehicle. Accordingly devices are provided which are affected by the degree of braking power applied to the brake mechanism at one wheel to affect braking mechanism at the other wheel. More specifically provision is made for relative movement of the respective brake anchors and mechanism is provided which will cause a corresponding movement between the anchors to equalize the braking torque upon the application of the brakes, the movement of the brake anchor upon one side of the vehicle causing the rotation of a shaft which motion is transmitted in a reverse direction to a shaft upon the opposite side of the vehicle from which motion in the opposite direction is transmitted to the brake anchor on that side to cause an equal and opposite movement thereof.

The invention will now be described more fully with reference to the accompanying drawings illustrating a preferred embodiment thereof and in which:

Figure 1 is a view partly in elevation and partly in section of the rear drive of a motor vehicle showing the application of the invention thereto.

Figure 2 is a fragmentary view showing means for adjusting the brake torque equalizing devices upon opposite sides of the vehicle with respect to each other.

Figure 3:
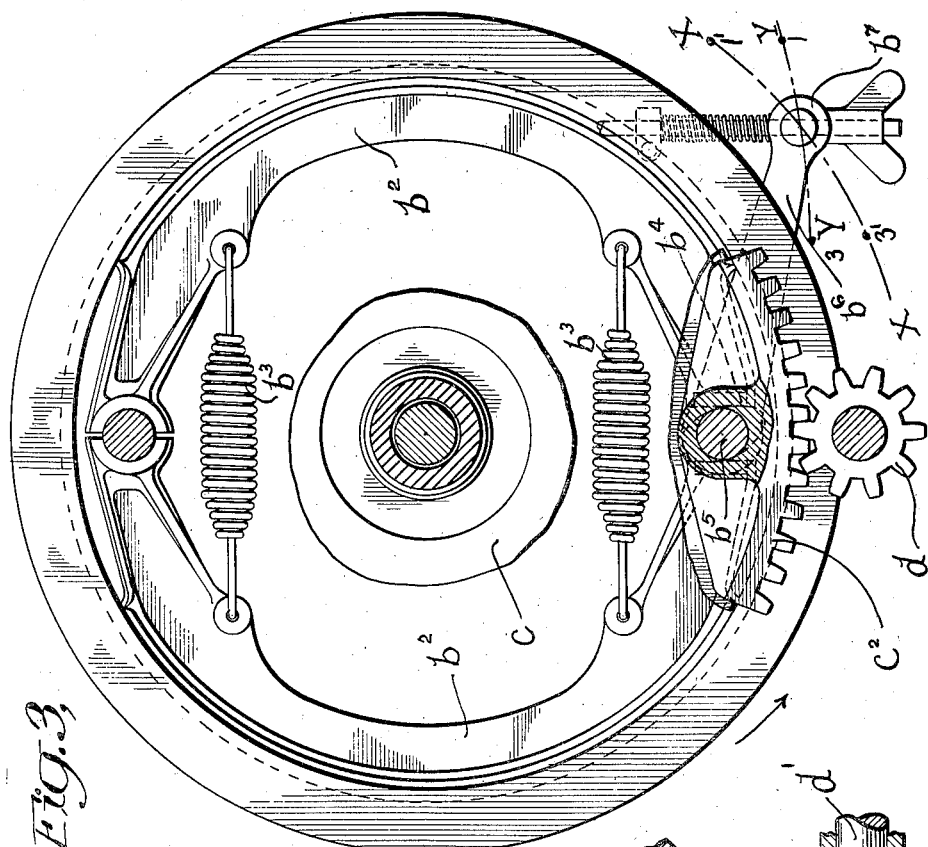
Figure 3 is a view showing the brake actuating mechanism applied to the driving wheel of a motor vehicle looking from the left in Figure 1 and with the wheel removed in the interest of clearness.
Figure 4:
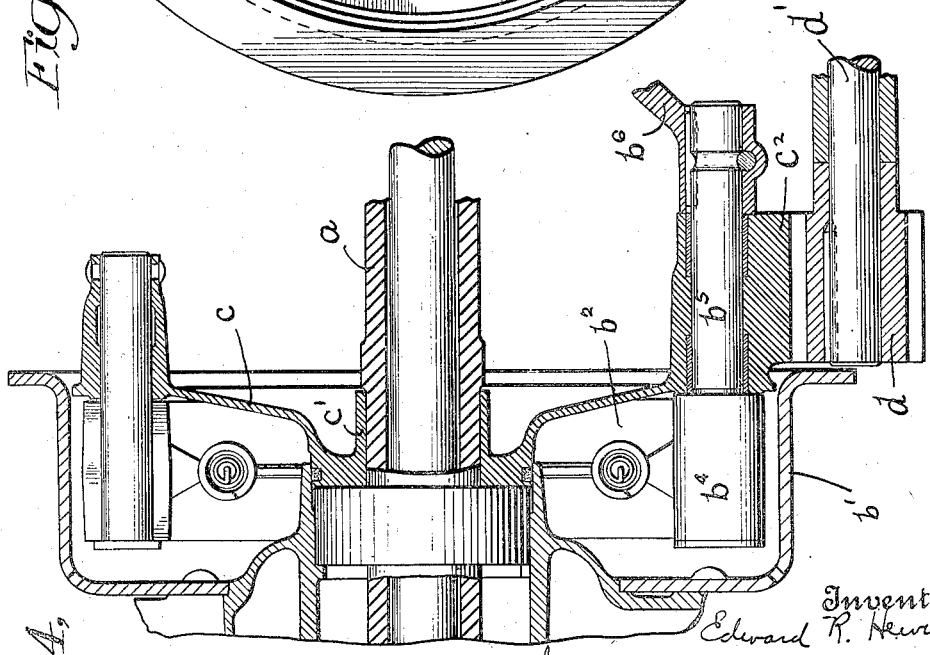
Figure 4 is a fragmentary view of the left-hand portion of Figure 1 somewhat enlarged to show in greater detail the application of the invention.

The brake torque equalizing devices are shown as applied to a conventional rear end drive in motor vehicles wherein the dead axle section $a$ is formed with a housing $a'$ for the differential and is supported in rotative relation therewith upon the driving wheels $b$. As is customary the wheels carry a brake drum $b'$ containing therewithin the brake shoes $b^2$, $b^2$ pivotally mounted upon a brake anchor casting $c$ serving as the inner closure for the brake drum. The brake shoes are adapted to be retained in retracted position by the usual springs $b^3$, $b^3$ and to be expanded into engaging relation with the brake drum by means of the usual cam $b^4$ carried upon the shaft $b^5$ rotatably mounted on the brake anchor and caused to turn as is usual by any convenient brake actuating mechanism, a lever arm for this purpose being indicated at $b^6$. Instead of forming the brake anchor casting rigid with respect to the dead axle $a$ the brake anchor casting is rotatably mounted upon the dead axle as is clearly shown in Figures 1 and 3 at $c'$ while a gear sector $c^2$ is formed thereupon or carried therewith. The gear sector $c^2$ is in mesh with a pinion $d$ carried upon the end of a shaft $d'$ rotatably mounted in an arm $d^2$ secured to the axle $a$. Shaft $d'$ extends approximately to the center line of the vehicle and carries at its inner end a bevel gear $d^3$. While the foregoing description has been applied to only one side of the vehicle, it will be apparent from an inspection of Figure 1 that a similar disposition of parts is made with respect to the brake operating mechanism at the wheel upon the opposite side of the vehicle, similar reference characters being applied to similar parts but given in capital letters to facilitate an understanding of the invention. A similar shaft $d'$ carries at its inner end a bevel gear $D^3$. These two bevel gears are in mesh with a bevel gear $e$ rotatably mounted in a housing $e'$ forming the bearings for the respective shafts $d'$, $D'$ and in turn being journaled in an extension of the differential housing $a'$. It will be apparent therefore that the gears $d^3$, $D^3$ and $e$ form a reversing mechanism whereby when the shaft $d'$ rotates say in a clockwise direction, the shaft $D'$ shown for instance, at the left-hand side of Figure 1 will be caused to rotate in a counterclockwise direction to cause a counterclockwise rotation of the pinion B which will cause appropriate movement of the gear sector $C^2$ as will be understood.

It is thought that the operation of the device is apparent from the foregoing, but a brief description of the operation will now be given. Suppose that when the brakes are applied the left-hand shoes $b^2$, $b^2$ have a better coefficient friction due to any of the well known causes, which will tend to rotate the brake anchor casting $c$ about the dead axle $a$ in a counterclockwise direction when looking at Figure 3. Brake anchor casting $c$, having attached thereto the gear sector $c^2$ which meshes with pinion $d^2$ will turn the pinion in a clockwise direction and with it the shaft $d'$ and bevel gear $d^3$. This motion is transmitted through the bevel gear $e$ to the bevel gear $D^3$ upon the other shaft $D'$ to cause the rotation of that bevel gear and shaft in a counterclockwise direction (looking from the right in Figure 1). Rotation of the shaft $D'$ and the gear $D^2$ in a counterclockwise direction will cause the movement of the gear sector $C^2$ and brake anchor casting C to move in a clockwise direction about the axle $a$. Referring now to Figure 3, when the brake anchor $c$ rotates about the axle $a$, the brake lever eye $b^7$ will move in the arc X, X but the eye will also travel about the arc Y, Y due to the location of the pull rod which is not shown. The pull rod operates in its usual manner as is well understood. Therefore, as the eye $b^7$ moves along the arc Y, Y to the point 1 under the action of the pull rod, it will also have a movement due to the rotation of the brake anchor casting along the arc X, X whereby its ultimate position will be indicated at 1' in Figure 3 and the brake is released or at least the application of the braking power is lessened to a degree. The action of the equalizing gearing has in the meantime moved the point of the brake lever eye (not shown) on the right-hand side of the axle from a position corresponding to the point indicated at 3 in Figure 3 to the point corresponding to the position indicated at 3' in that figure, thereby increasing the action of the brakes at the wheel on that side of the vehicle. In this manner, the brake which has the greater coefficient friction is caused to have a somewhat lessened braking effect upon the brake drum while the brake having the lesser coefficient friction is caused to be operated with greater effect until the two braking effects are equal.

As will sometimes occur an adjustment may be required between the relative positions of the gear sectors $c^2$, $C^2$. To effect this change, provision is made for a slight rotation of one of the gear sectors with respect to the dead axle while the other gear sector is maintained stationary. To this end an extension of the journal $e^2$ of the housing $e'$ is engaged by an arm $f'$ in any convenient manner as by clamping the bifurcated ends of the arm $f'$ about the journal $e^2$. The extremity of the arm $f'$ is bored as at $f^2$ to receive a threaded rod or screw $f^4$ pivotally secured at its upper end to the housing $a'$, nuts $f^5$ being threaded on to the screw $f^4$ upon opposite sides of the arm $f^2$ so that by loosening the nut on one side of the arm and taking up the nut on the opposite side thereof the angularity of the arm $f'$ and hence of the housing $e'$ may be altered.

Various modifications may be made in the particular instrumentalities disclosed for transmitting motion between the respective brake anchors as well as in the means for adjusting the relative positions thereof and no limitation is intended by the foregoing description except as indicated by the accompanying claims.

What I claim is:

1. The combination with an axle, the wheels of a motor vehicle and brake drums carried by the respective wheels, of brake shoes movably mounted with respect to the brake drums, means operatively connecting the respective brake shoes to transmit motion of one to the other and means to adjust said means to vary the angular position of one with respect to the other.

2. The combination with an axle, the wheels of a motor vehicle and brake drums respectively carried thereby and sets of brake shoes engageable with the brake drums, of brake anchors for the respective sets of brake shoes movable with respect to the axle, gear sectors carried with the brake anchors respectively, a shaft, pinions carried with the shaft and engaging the sectors and reversing mechanism to alter the relative rotation of the pinions.

3. The combination with an axle, the wheels of a motor vehicle and brake drums respectively carried thereby and sets of brake shoes engageable with the brake drums, of brake anchors for the respective sets of brake shoes movable with respect to the axle, gear sectors carried with the brake anchors respectively, a shaft, pinions engaging the sectors, reversing mechanism to alter the relative rotation of the pinions, and means to adjust the brakes on the respective wheels initially with respect to each other.

4. The combination with an axle, the wheels of a motor vehicle and brake drums respectively carried thereby and sets of brake shoes engageable with the brake drums, of brake anchors for the respective sets of brake shoes movable with respect to the axle, gear sectors carried with the brake anchors respectively, shaft sections, pinions carried with the remote ends of the shaft sections and engageable with the sectors, bevel gears carried with the proximate ends of the shaft sections, and a bevel gear in mesh with said first mentioned bevel gears.

5. The combination with an axle, the wheels of a motor vehicle and brake drums respectively carried thereby and sets of brake shoes engageable with the brake drums, of brake anchors for the respective sets of brake shoes movable with respect to the axle, gear sectors carried with the brake anchors respectively, shaft sections, pinions carried with the remote ends of the shaft sections and engageable with the gear sectors, bevel gears carried with the proximate ends of the shaft sections, a housing for said bevel gears, a third bevel gear carried within the housing and in mesh with said two first mentioned bevel gears, and means to adjust the position of the housing.

This specification signed this 17th day of December, A. D. 1924.

EDWARD R. HEWITT.